(12) United States Patent
Holland (10) Patent No.: US 8,608,602 B2
(45) Date of Patent: Dec. 17, 2013

(54) BELT CLUTCH

(76) Inventor: Ronald A. Holland, Orange, CA (US)

( * ) Notice: Subject to any disclaimer, the term of this patent is extended or adjusted under 35 U.S.C. 154(b) by 816 days.

(21) Appl. No.: 12/567,712

(22) Filed: Sep. 25, 2009

(65) Prior Publication Data

US 2010/0075792 A1    Mar. 25, 2010

Related U.S. Application Data (60) Provisional application No. 61/099,908, filed on Sep. 25, 2008.

(51) Int. Cl.
*F16H 55/36* (2006.01)
*F16D 11/06* (2006.01)

(52) U.S. Cl.
USPC .............................................. 474/166; 192/80

(58) Field of Classification Search
USPC .......... 474/11, 166, 119, 118, 70, 28; 192/79, 192/80, 85.37, 224.1, 224.2
See application file for complete search history.

(56) References Cited

U.S. PATENT DOCUMENTS

| | | | |
|---|---|---|---|
| 2,254,592 A | 9/1941 | Berkeley | |
| 2,576,605 A | 11/1951 | Hupp | |
| 2,632,335 A | 3/1953 | Ciaccio | |
| 2,868,113 A | 1/1959 | Harrer | |
| 3,098,396 A | 7/1963 | Unruh | |
| 3,800,612 A | 4/1974 | Fulghum | |
| 4,018,096 A | 4/1977 | Foster | |
| 4,036,070 A | 7/1977 | Knight | |
| 4,068,535 A * | 1/1978 | Sheets | 474/132 |
| 4,324,552 A | 4/1982 | Boushek, Jr. et al. | |
| 4,422,396 A * | 12/1983 | Szostak et al. | 112/261 |
| 4,557,710 A | 12/1985 | Greider | |
| 4,582,504 A * | 4/1986 | Schlapman et al. | 474/119 |
| 4,969,856 A | 11/1990 | Miyata et al. | |
| 5,354,241 A | 10/1994 | Trefz et al. | |
| 6,071,205 A * | 6/2000 | Ohno et al. | 474/168 |
| 6,224,506 B1 | 5/2001 | Peeters et al. | |
| 2005/0153805 A1* | 7/2005 | Koyama | 474/28 |
| 2007/0232426 A1* | 10/2007 | Pflug et al. | 474/136 |

* cited by examiner

*Primary Examiner* — William E Dondero
*Assistant Examiner* — Robert T Reese
(74) *Attorney, Agent, or Firm* — Kenneth L. Green (57) ABSTRACT

An improved belt clutch engages to couple one shaft to at least one other shaft and disengaged to decouple the shafts. Known belt clutches fail to smoothly and completely disengage the belt from traction pulleys on the shafts and drag results. The improved belt clutch includes rollers outlining the engaged belt and constrain the disengaged belt to smoothly and completely disengage the belt from the traction pulleys. The new improved belt clutch provides, among other things, higher efficiency when driven in either direction and smoother operation when engaged or disengaged at high speed than prior art belt clutches.

14 Claims, 5 Drawing Sheets

000000# BELT CLUTCH

The present application claims the priority of U.S. Provisional Patent Application Ser. No. 61/099,908 filed Sep. 25, 2008, which application is incorporated in its entirety herein by reference.

BACKGROUND OF THE INVENTION

Present invention relates in general to belt clutches and in particular to apparatus for reducing drag when a belt clutch is disengaged.

Belt clutches engage traction pulleys to transmit torque from one shaft to at least one other shaft and disengages to stop the torque from being transmitted. Some known belt clutches that are engaged by either moving an idler pulley against a belt to tighten it around the traction pulleys and disengaged by moving it away to loosen the belt. Other belt clutches are engaged by moving one of the traction pulleys away from the other traction pulley and disengaged by moving the traction pulleys together. Both types of belt clutches share a common problem. When the clutch is disengaged, the belt is normally still in contact with belt surfaces of the traction pulleys which are moving at different speeds. This creates a significant amount of undesirable drag and belt wear.

If an enclosure is correctly positioned around the perimeter of the belt of an engaged belt clutch, when the belt clutch is disengaged, the inside surface of the enclosure will constrain the belt in a position which causing the belt to separate from the traction pulleys. This allows the traction pulleys to rotate freely without dragging on the belt and provides a very simple and efficient combination clutch and speed reducing or speed increasing, power transmission device.

However, the mere presence of an enclosure around the belt still has disadvantages. When the belt is disengaged at high speed and moves out against the enclosure, the belt hits some parts of the stationary enclosure, causing the belt to rapidly bounce around between the pulleys and the enclosure, causing vibration, noise, added wear, heat, and loss of efficiency. Accordingly, a need remains for a simple belt clutch mechanism which biases the belt away from the traction pulleys and eliminates the belt drag and vibration when disengaged or being disengaged during operation up to its rated speed.

BRIEF SUMMARY OF THE INVENTION

The present invention addresses the above and other needs by providing an improved belt clutch which engages to couple one shaft to at least one other shaft and disengages to decouple the shafts. Known belt clutches fail to smoothly and completely disengage the belt from traction pulleys on the shafts and drag results. The improved belt clutch includes rollers which outline the engaged belt and constrain the disengaged belt to smoothly and completely disengage the belt from the traction pulleys. The new improved belt clutch provides, among other things, higher efficiency when driven in either direction and smoother operation when engaged or disengaged at high speed than prior art belt clutches.

In accordance with one aspect of the invention, there is provided a belt clutch comprising a first traction pulley, a second traction pulley, and a belt coupling the traction pulleys. The belt is disengaged by moving at least one of the traction pulleys toward the other traction pulley. Constraints reside outside the belt, spaced at least about one belt thickness outside the belt when the belt clutch is engaged (i.e., under tension due to separation of the traction pulleys). The constraints preferably comprise a first constraint partially circling the first traction pulley and reaching toward the second traction pulley and a second constraint partially circling the second traction pulley and reaching toward the first traction pulley. The inside surfaces of both halves of the partial enclosure provide a low friction inside surface for contact with the outside surface of the belt so that the belt slides gently to a stop when it is disengaged from the traction pulleys and moves out against the enclosures. Wherever the enclosure exists, it should be at least about the thickness of the belt away from the traction pulleys and there should be at least a partial rim around each side of the enclosure extending toward the inside (the traction pulley side) of the enclosure at least about the thickness of the belt. The distance between the inside of the rim on one side of the enclosure and the inside of the rim on the other side should be slightly larger than the width of the belt to keep the belt in line with the traction pulleys but not prevent it from moving back and forth in the enclosure on its own power when the clutch is engaged and disengaged. In the disengaged position, the parts of the enclosure around the belt must be positioned so that the belt stays tight against them preventing the belt from dragging against the traction pulleys.

In accordance with yet another aspect of the present invention, there is provided a belt clutch including bearings (or rollers) for constraining the disengaged belt. The rollers may be mounted to a housing or other element of the belt clutch assembly and located in the correct positions to cause the belt to separate from the traction pulleys and to allow the belt to glide to a stop more slowly when released at high speed. This embodiment, like the previous one, allows the belt clutch to be driven in either direction under full rated load with comparable efficiency. But it can also be quickly disengaged during no load conditions up to its rated speed and it will smoothly come to rest against the rollers completely away from the rotating traction pulleys.

In accordance with yet another aspect of the present invention, there is provided a belt clutch employing one idler pulley and translationally fixed traction pulleys. The idler pulley is moved towards the belt to tighten the belt and engage the belt clutch. This embodiment is preferred for applications where the input and output shafts cannot move with respect to each other and the torque is not transmitted through the side of the belt that rolls over the idler pulley.

In accordance with another embodiment of the present invention, there is provided an automatic, bi-directional belt clutch employing a single actuator to move two idler pulleys together against the outside surfaces of the belt to engage the clutch, and away from each other to disengage the clutch. The two idler pulleys and the actuator form a shuttle which is free to float in a grove which is approximately perpendicular to a line between the centers of the two traction pulleys. With no torque applied to the clutch the actuator moves the two idler pulleys to a fixed position that partly tightens the belt around the two traction pulleys and causes the pulleys to rest in a position about equidistant from the line between the centers of the two traction pulleys. Therefore, when torque is applied to the drive pulley, the part of the belt placed in tension by the traction pulleys tries to straighten out and pushes the shuttle in its direction which increases the tension on the other side of the belt. This action is highly desirable because it automatically increases the belt tension on the lower tension side of the drive as the torque increases and lowers the tension as the torque decreases which lowers belt wear and increases efficiency. It can be seen from the description of the prior art and the above summary of the present invention, how this new concept of a belt drive clutch with a low friction, belt capturing enclosure and an automatic, bi-directional belt tensioning devise can overcome the disadvantages of the frictional drag and other limitations associated with the prior art.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
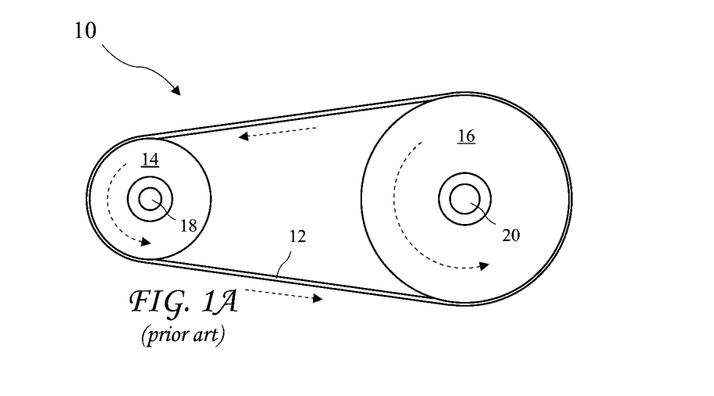
FIG. 1A is an engaged prior art belt clutch.
Figure 1B:
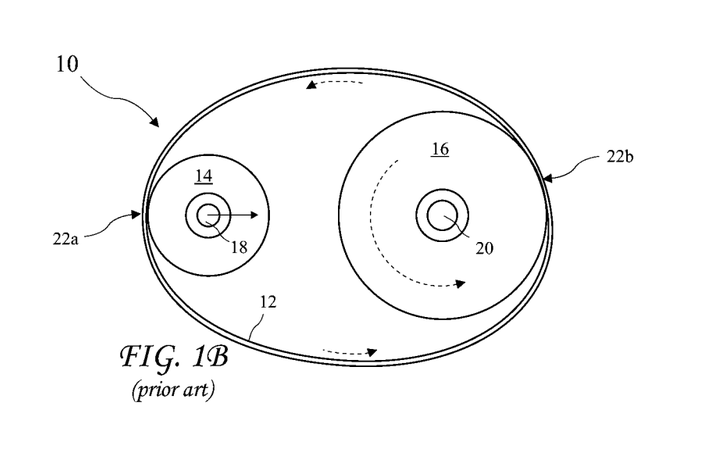
FIG. 1B is a disengaged prior art belt clutch.

A prior art belt clutch 10 is shown engaged in FIG. 1A, and disengaged in FIG. 1B. The belt clutch 10 includes traction pulleys 14 and 16 on shafts 18 and 20 respectively, and a belt 12 coupling the traction pulleys 14 and 16. When the traction pulleys 14 and 16 are moved closer together to disengage, the belt 12 attempts to assume a round shape. Unfortunately, the belt generally remains in contact with the traction pulleys at locations 22a and 22b, and drag results causing wear on the belt and lost efficiency.

Figure 2A:
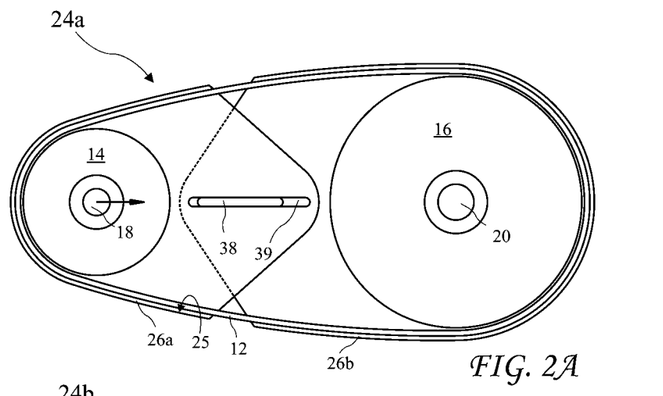
FIG. 2A is an example of a first embodiment of the present invention having a low friction inner surface to constrain the belt during disengagement, in the disengaged position.
Figures 2B, 2C:
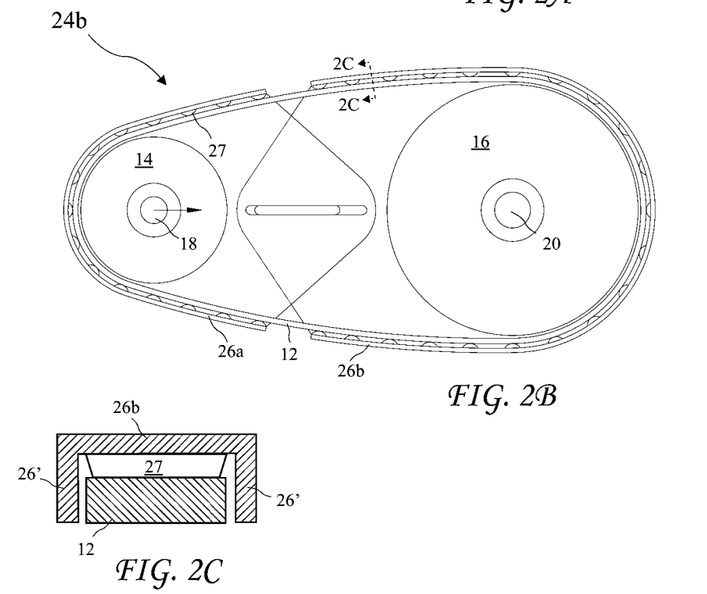
FIG. 2B is an example of the first embodiment of the present invention having low friction pads on the inner surface to constrain the belt causing the belt to separate from the traction pulleys in the disengaged position.
FIG. 2C is a cross-sectional view of a belt enclosure, low friction pad, and belt taken along line 2C-2C of FIG. 2B.

A belt clutch assembly 24a of a first embodiment of the present invention with enclosures 26a and 26b having a low friction inner surface 25 to constrain the belt 12 when disengaged from the traction pulleys 14 and 16 is shown in FIG. 2A and an improved belt clutch 24b with the enclosures 26a and 26b having low friction pads 27 on the inner surface to constrain the belt 12 causing the disengaged belt 12 to separate from the traction pulleys 14 and 16 is shown in FIG. 2B. The enclosures 26a and 26b restrict the outward movement of the belt 12 around the traction pulleys 14 and 16 when they move closer together and the belt 12 is disengaged. After belt 12 is disengaged, the belt 12 resides tightly against the inner surface 25 of enclosures 26a and 26b to keep the belt 12 completely separated the traction pulleys 14 and 16 to eliminate any belt drag. The low friction inner surface 25 preferably has a coating to reduce friction and the low friction pads 27 are preferably a low friction material to reduce drag or are coated with a low friction material to reduce drag. The enclosures 26a and 26b are preferably translationally fixed to the traction pulley 14 and the traction pulley 16 respectively. One or both of the traction pulley 14 and the traction pulley 16 are moveable to disengage the belt clutch 24a and 24b and the corresponding enclosure 26a and/or 26b preferably moves with the traction pulley 14 and/or the traction pulley 16 to maintain the position of the low friction inner surface 25 or the low friction pads 27 to the traction pulley 14 and/or 16.

A cross-sectional view of the belt enclosure 26b, the low friction pad 27, and the belt 12 taken along line 2C-2C of FIG. 2B is shown in FIG. 2C. The belt enclosure 26b includes rims 26' extending toward the belt 12 on each side of the enclosure 26b which center the belt 12 in the enclosure 26b.

Figures 3A, 3B, 4A, 4B:
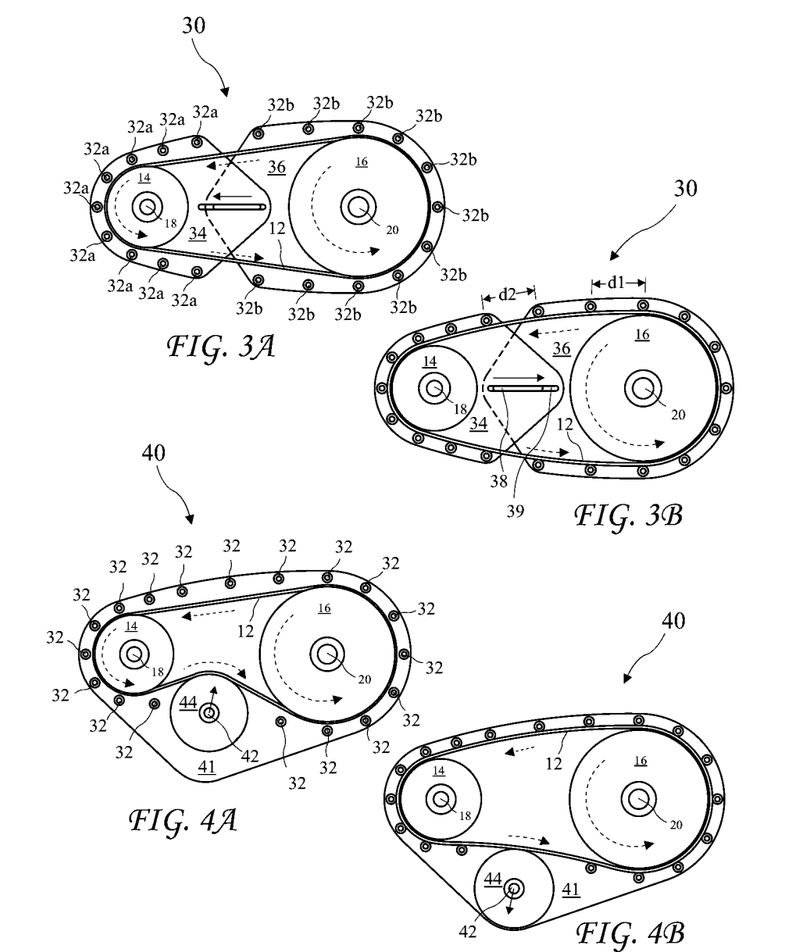
FIG. 3A is an example of the first embodiment of the present invention having rollers, in the engaged position.
FIG. 3B is an example of the first embodiment of the present invention having rollers, in the disengaged position.
FIG. 4A is a second embodiment of the present invention, with one idler pulley, in the engaged position.
FIG. 4B is the second embodiment of the present invention, with one idler pulley, in the disengaged position.

A belt clutch assembly 30 having rollers, of the first embodiment of the present invention, is shown in the engaged position in FIG. 3A and in the disengaged position in FIG. 3B. The traction pulley 14 is fixedly mounted to shaft 18 which is rotatably mounted to a member 34 of the belt clutch assembly 30, and the traction pulley 16 is fixedly mounted to shaft 20 which is rotatably mounted to a member 36 of the belt clutch assembly 30. One or both of the members 34 and 36 are moving members and are kept in alignment with each other by a guide bar 38 attached to the moving member 36 sliding in a guide slot 39 in moving member 34. In the engaged position, the belt clutch assembly 30 transmits power in either direction, from the shaft 18 to the shaft 20 or from the shaft 20 to the shaft 18, through traction pulleys 14 and 16 and belt 12. When engaged, the traction pulley 14 separates from the traction pulley 16 far enough to tighten the belt 12 on the traction pulleys 14 and 16 to the correct tension to transmit the required torque between traction pulleys 14 and 16. Preferably, the member 34 separates from the member 36 as the traction pulley 12 separates from the traction pulley 16 to maintain the spacing between the members 34 and 36 and the traction pulleys 14 and 16 respectively.

Constraints comprising rollers 32a and 32b are positioned around the belt 12 and may be attached to the member 34 and 36 respectively. The rollers 32a and 32b are preferably separated from the belt 12 by about one belt thickness when the belt 12 is in tension (i.e., when the clutch is engaged). Adjacent rollers 32a and 32b on each members 34 and 36 are spaced d1 apart, and adjacent roller 32a and 32b across the members 34 and 36 are spaced d2 apart, and are close enough together to prevent the belt 12 from bulging outward between adjacent rollers 32a and 32b. In the disengaged position, the traction pulleys 14 and 16, and the moving members 34 and 36, are moved together to remove tension from the belt 12, and the belt 12 moves outward and against the rollers 32a and 32b. Because the belt 12 is constrained by the rollers 32a and 32b, resulting in very little resistance to tangential motion of the belt 12 when the belt 12 contacts the rollers 32a and 32b, at high speed the belt 12 moves away from the traction pulleys 14 and 16 and the belt 12 assumes it's position against the rollers 32a and 32b and smoothly comes to rest.

While the first embodiment is described herein as including one or two moving traction pulleys, any belt clutch assembly having two or more traction pulleys where one or more of the traction pulleys are moveable to remove tension from a belt, is intended to come within the scope of the present invention.

A second embodiment of a belt clutch assembly 40 according to the present invention, with only one idler pulley 44, is shown in FIG. 4A in the engaged position and in FIG. 4B in the disengaged position. The single idler pulley 44 is mounted to a translating shaft 42 to engage and disengage the belt clutch assembly 40. Rollers 32 are positioned around the belt 12 and may be attached to a clutch housing 41 or otherwise mounted. The rollers 32 are separated from the belt 12 by about one belt thickness when the belt 12 is in tension (i.e., when the clutch is engaged). In the disengaged position, the idler pulley 44 is moved away from the belt 12 to remove tension from the belt 12, and the belt 12 moves outward and against the rollers 32, but may remain in contact with the idler pulley 44. Because the portion of the belt 12 between the traction pulleys 14 and 16 and opposite the idler pulley 44 is constrained by the rollers 32, the belt 12 moves away from the traction pulleys 14 and 16. Because the belt 12 is constrained by the rollers 32 resulting in very little resistance to tangential motion of the belt when the belt contacts the rollers 32, the belt 12 smoothly assumes its disengaged position against the rollers 32.

In FIG. 4A the pulley 44 has been moved into belt 12 with enough force to provide adequate belt tension to transmit the required torque from traction pulley 14 to traction pulley 16 in the counter clockwise direction, or from traction pulley 16 to traction pulley 14 in the clockwise direction, which produces the maximum belt tension in the straight (or opposite the idler pulley 44) side of the belt 12. However, when torque is applied to traction pulley 14 or 16 in the opposite direction, which produces maximum tension in the idler pulley 44 side of the belt 12, the force on the idler pulley 44 must be greatly increased to allow transmission of the same amount of torque. This increased force on idler pulley 44 decreases the overall efficiency of the drive. Therefore, belt clutch assembly 40 is only recommended for applications where the idler pulley 44 is on the low tension side of the belt 12.

Figures 5A, 5B, 5C:
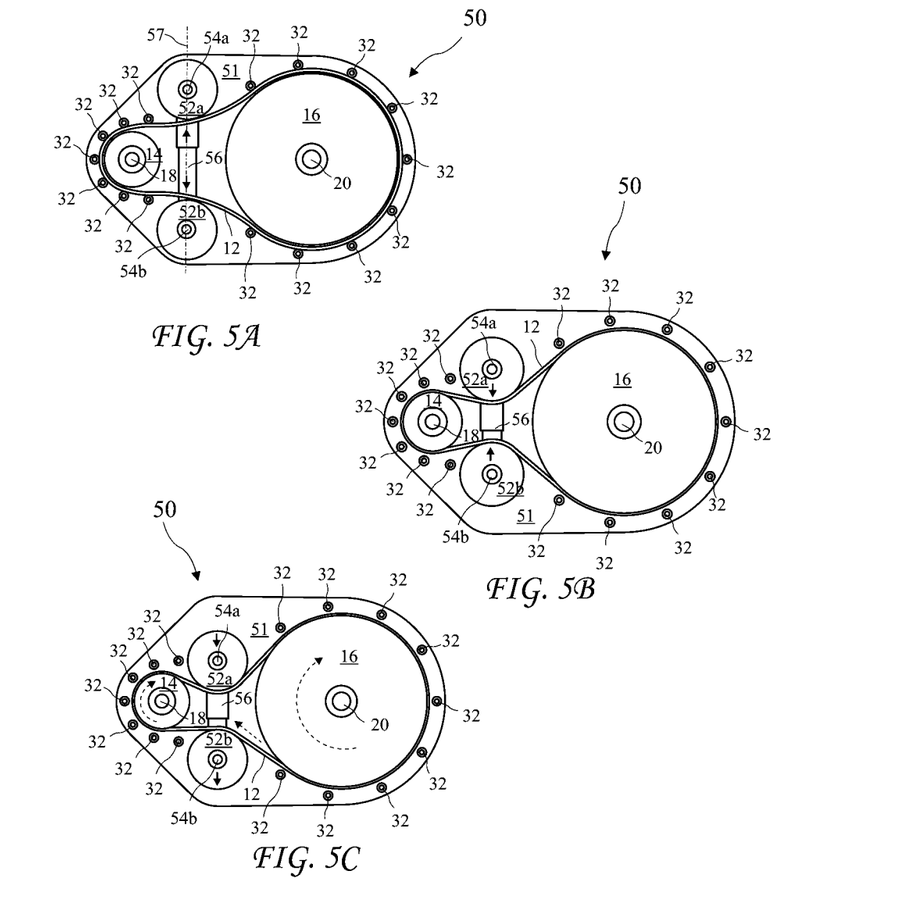
FIG. 5A is a third embodiment of the present invention, with two cooperating idler pulleys, in the disengaged position.
FIG. 5B is the third embodiment of the present invention, with two cooperating idler pulleys, in the engaged position with no torque applied.
FIG. 5C is the third embodiment of the present invention, with two cooperating idler pulleys, in the engaged position with torque applied.

A third embodiment of the belt clutch assembly 50 according to the present invention, with two cooperating idler pulleys 52a and 52b rotatably mounted on shafts 54a and 54b, is shown in FIG. 5A in the disengaged position, and in FIG. 5B and FIG. 5C in the engaged position. Rollers 32 are positioned around the belt 12 and may be attached to a clutch housing 51 or otherwise mounted. The rollers 32 are separated from the belt 12 at the closest point by about one belt thickness when the belt 12 is in tension (i.e., when the clutch is engaged). The belt clutch assembly 50 is similar to the belt clutch assembly 40 above, except that the single idler pulley 44 is replaced by the two cooperating idler pulleys 52a and 52b on opposite ends of an actuator 56. When the clutch is engaged and no torque is applied the actuator 56 and the pulleys 52a and 52b are biased to a centered position by the belt 12, but will move back and forth in a direction that is about perpendicular to the center line between the two shafts 18 and 20 when torque is applied in different directions. The actuator 56 and the pulleys 52a and 52b are about laterally centered on an actuator centerline 57 approximately centered between adjacent edges of the two traction pulleys 14 and 16, but generally a little closer to the smaller of the two pulleys.

In FIG. 5A, the actuator 56 has separated the idler pulleys 52a and 52b to disengage the belt clutch assembly 50. Because the portions of the belt 12 between and around the traction pulleys 14 and 16 are constrained by the rollers 32, the belt 12 is held away from the traction pulleys 14 and 16. Because the belt 12 is constrained by the rollers 32 during disengagement, the belt 12 smoothly assumes its disengaged position against the rollers 32. The rollers 32 are positioned (both location and spacing) around the belt 12 so that when the belt 12 is disengaged it makes contact with all of the rollers 32 and is completely out of contact with the traction pulleys 14 and 16.

In FIG. 5B the actuator 56 pulls the idler pulleys 52a and 52b together until the belt 12 is pulled against the traction pulleys 14 and 16 and there is no slack but there is still very little tension in the belt 12.

FIG. 5C shows the belt drive assembly 50 in operation in the clockwise direction with traction pulley 14 driving traction pulley 16 under a heavy load. The increased tension in the lower side of the belt 12 which is pressed against idler pulley 52b is pushing the actuator 56 and the two idler pulleys 52a and 52b toward pulley 52b with the two idler pulleys 52a and 52b maintaining the same separation with respect to each other as in FIG. 5B. The geometry of the upper and lower paths of the belt 12 is such that motion of the idler pulleys 52a and 52b away from center increases the total path of the belt 12, and thus increases tension in the belt 12. This is seen in comparing FIGS. 5B and 5C where the lower path is at shallow angles and approaches a minimum length straight flat path, and the upper path assumes larger angles and the path length continues to grow as the idler pulley 52a moves downward. This increases the tension in the belt 12 as the torque on the traction pulley 14 increases, which keeps the belt 12 from slipping under heavy load, and also increases efficiency by decreasing the tension in the belt 12 under light load. If the direction of the torque reverses, the actuator 56 slides in the opposite direction and performs the same tension limiting function providing automatic and completely bi-directional and torque compensating when engaged but drag free when disengaged.

Figure 6:
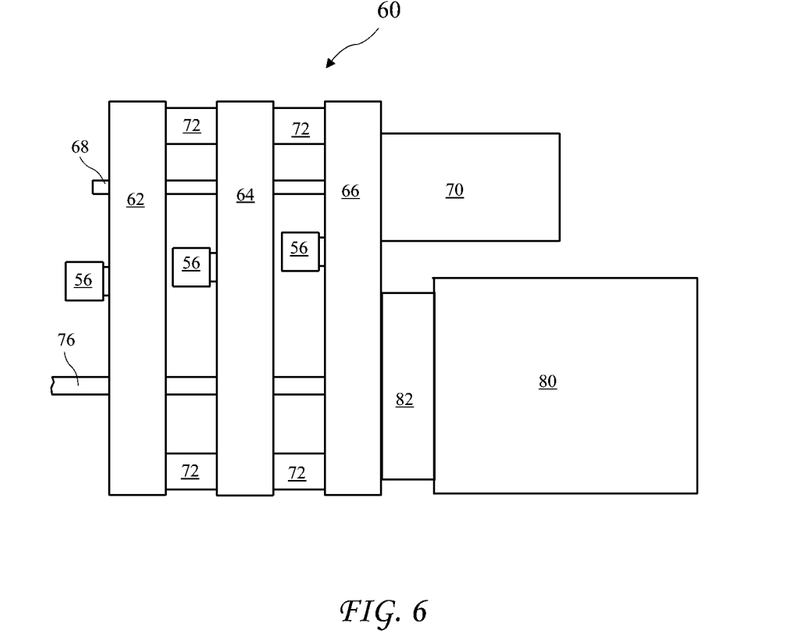
FIG. 6 shows a three speed hybrid transmission according to the present invention with direct drive capability for an internal combustion engine or a large electric motor, the hybrid transmission comprising three belt clutches each with different reduction ratios.

A three speed hybrid transmission 60 with direct drive capability for an internal combustion engine 80 or a large electric motor (not shown), comprising three belt clutches 62, 64, and 66 each with different reduction ratios, is shown in FIG. 6. Each of the belt clutches 62, 64, and 66 are preferably of the type described above as belt clutch assembly 50, the third embodiment of the belt clutch according to the present invention, with actuator 56 operating two idler pulleys 52a and 52b (see FIG. 5). The belt clutches 62, 64, and 66 are fixedly connected together with spacers 72 between them to create space for actuators 56, they and share a common input shaft 68 and an output (or drive) shaft 76. The output shaft 76 is operatively connected to at least one wheel to drive a vehicle. The case of an electric motor 70 is fixedly mounted to the housing of belt clutch 66 so that with the proper coupling, the electric motor 70 can drive shaft 68 efficiently. A bell housing 82 of the engine 80 is also fixedly mounted between the engine 80 and the housing of belt clutch 66 so that with the proper coupling, the engine 80 can also the output shaft 76 efficiently. The engine 80 must be coupled to the output shaft 76 through a uni-directional clutch (not shown), such as a clutch bearing or the like, so that when the electric motor 70 alone is driving shaft 76 through one of the belt clutches 62, 64, or 66, the engine 80 does not need to turn. If the engine 80 is replaced by a second electric motor, the clutch bearing may not be necessary.

The combination of elements shown in FIG. 6 represents a very efficient, plug-in, parallel hybrid drive system, because the electric motor 70 can very efficiently drive a vehicle up to speed, engaging each of the different ratio belt clutches 62, 64, and 66, one at a time, and when the high gear belt is engaged, engine 80 can be started and/or engaged and both the electric motor 70 and the engine 80 can drive the vehicle. When the engine 80 is engaged the high gear clutch can be disengaged and the engine 80 can drive the vehicle at high speed without any drag from the transmission 60. This hybrid drive system 60 needs no torque converter or any other slipping clutch type of energy wasting device because the engine 80 is never used to accelerate the vehicle from a standing start or at low speed. With an adequate battery pack this vehicle could be driven efficiently in the city for a long distance without ever turning on the engine 80.

While the hybrid transmission 60 is described above in the context of a hybrid electric/internal combustion vehicle, a transmission comprising at least two belt clutches as described herein may have other applications, such as an electric only vehicle, and an transmission comprising at least two belt clutches as described herein is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A belt clutch comprising:
   a first traction pulley;
   a second traction pulley horizontally displaced from the first traction pulley;
   a belt rotationally coupling the first and second traction pulleys;
   two vertically displaced rotating idler pulleys residing between the first and second traction pulleys, the idler pulleys having an engaged position increasing tension on the belt and coupling the rotation of the first traction pulley to the second traction pulley causing the second traction pulley to rotate when the first traction pulley rotates and a disengaged position reducing tension on the belt and decoupling the rotation of the first traction pulley to the second traction pulley allowing the first traction pulley to rotate without causing the second traction pulley to rotate;
   a multiplicity of rollers residing outside a closed loop of the belt and spaced apart from the belt while the idler pulleys are in the engaged position, the multiplicity of rollers limiting the outward movement of portions of the belt around the traction pulleys when the idler pulleys are in the disengaged position; wherein the two idler pulleys are jointly mounted to an actuator to move the two idler pulleys together and apart; the actuator is free to move in the direction about perpendicular to the displacement of the traction pulleys, wherein: when driving the first traction pulley in a clockwise direction under a load, an increased tension in the lower side of the belt which is pressed against a lower one of the idler pulleys pushes the actuator and the two idler pulleys downward with the two idler pulleys maintaining the same separation with respect to each other; the geometry of the upper and lower paths of the belt is such that vertical motion of the idler pulleys away from center increases the path of the belt and increases tension in the belt as the torque on the first traction pulley increases, keeping the belt from slipping under heavy load, and increasing efficiency by decreasing the tension in the belt under light load; and when driving first traction pulley in a counter-clockwise direction under a load, the actuator slides in an opposite direction and provides the same tension limiting function providing automatic and completely bi-directional and torque compensating when engaged but drag free when disengaged.

2. The belt clutch of claim 1, wherein the idler pulleys reside outside the belt, and in the engaged position the idler pulleys draw portions of the belt between the traction pulleys together to increase the tension on the belt.

3. The belt clutch of claim 2, wherein the idler pulleys are connected by an actuator controlling the positions of the idler pulleys.

4. The belt clutch of claim 3, wherein the rollers include a multiplicity of the rollers positioned around a larger diameter one of the traction pulleys and circling more than half way around the larger diameter pulley.

5. The belt clutch of claim 4, wherein the rollers further include a multiplicity of the rollers positioned around a smaller diameter one of the traction pulleys and circling more than half way around the smaller diameter pulley.

6. The belt clutch of claim 3, wherein the rollers are separated from the belt at the closest point by about one belt thickness when the belt is in tension.

7. The belt clutch of claim 2, wherein the idler pulleys are displaced in a direction about perpendicular to the displacement of the traction pulleys.

8. The belt clutch of claim 2, wherein the belt is free from contact with any non-rotating surface to minimize drag on the belt.

9. The belt clutch of claim 8, wherein the idler pulleys and the rollers are free-wheeling to minimize drag on the belt.

10. A hybrid transmission for a vehicle, the hybrid transmission comprising:
    at least two belt clutches in parallel between a motor shaft and a driven shaft, wherein each belt clutch has a different drive ratio, the belt clutches comprising:
       a first belt clutch comprising:
          a first drive pulley;
          a first driven pulley horizontally spaced apart from the first drive pulley; and
          a first belt rotationally coupling the first drive and driven pulleys at a first drive ratio;
       a second belt clutch comprising:
          a second drive pulley;
          a second driven pulley horizontally spaced apart from the second drive pulley; and
          a second belt rotationally coupling the second drive and driven pulleys at a second drive ratio different from the first drive ratio;
    two vertically displaced rotating idler pulleys residing between each pair of drive and driven pulleys, the idler pulleys having an engaged position increasing tension on the belts and a disengaged position reducing tension on the belts;
    a multiplicity of rollers residing outside a closed loop of the belts and spaced apart from the belts while the idler pulleys are in the engaged position, the multiplicity of rollers limiting the outward movement of portions of the belts around the pulleys when the idler pulleys are in the disengaged position; wherein the pairs of two idler pulleys are jointly mounted to actuators to move the pairs of two idler pulleys together and apart; the actuators are free to move in the direction about perpendicular to the displacement of the pairs of drive and driven pulleys, wherein: when driving the drive pulleys in a clockwise direction under a load, an increased tension in the lower side of the corresponding belt which is pressed against a lower one of the idler pulleys pushes the actuators and the pair of two idler pulleys downward with the pair of two idler pulleys maintaining the same separation with respect to each other; the geometry of the upper and lower paths of the belts are such that vertical motion of the pair of idler pulleys away from center increases the path of the belts and increases tension in the belts as the torque on the first traction pulley increases, keeping the belts from slipping under heavy load, and increases efficiency by decreasing the tension in the belts under light load; and when driving drive pulleys in a counter-clockwise direction under a load, the actuators slides in an opposite direction and provides the same tension limiting function providing automatic and completely bi-directional and torque compensating when engaged but drag free when disengaged.

11. The belt clutch of claim 10, wherein the rollers reside spaced apart around each traction pulley on sides of the traction pulleys opposite the other traction pulley.

12. The belt clutch of claim 10, wherein the rollers comprise a multiplicity of the rollers spaced apart around both of the traction pulleys and circling more than half way around each traction pulley on sides of the traction pulleys opposite the other traction pulley.

13. A belt clutch comprising:
   a first traction pulley;
   a second traction pulley displaced from the first traction pulley;
   a belt rotationally coupling the first and second traction pulleys;
   two rotating idler pulleys residing outside the belt and between the first and second traction pulleys and displaced in a direction about perpendicular to the displacement of the traction pulleys, the idler pulleys having:
      an engaged position wherein the two rotating idler pulleys are moved together to increasing tension on the belt and the second traction pulley is caused to rotate with the first traction pulley; and
      a disengaged position wherein the two rotating idler pulleys are moved apart reducing tension on the belt and the second traction pulley is free from rotating with the first traction pulley;
   wherein:
   the two idler pulleys are jointly mounted to an actuator to move the two idler pulleys together and apart;
   the actuator is free to move in the direction about perpendicular to the displacement of the traction pulleys,
   wherein:
   when driving the first traction pulley in a clockwise direction under a load, an increased tension in the lower side of the belt which is pressed against a lower one of the idler pulleys pushes the actuator and the two idler pulleys downward with the two idler pulleys maintaining the same separation with respect to each other;
   the geometry of the upper and lower paths of the belt is such that motion of the idler pulleys away from center increases the path of the belt and increases tension in the belt as the torque on the first traction pulley increases, keeping the belt from slipping under heavy load, and increasing efficiency by decreasing the tension in the belt under light load; and
   when driving first traction pulley in a counter-clockwise direction under a load, the actuator slides in an opposite direction and provides the same tension limiting function providing automatic and completely bi-directional and torque compensating when engaged but drag free when disengaged.

14. The belt clutch of claim 13, further including a multiplicity of rollers residing outside a closed loop of the belt and spaced apart from the belt while the idler pulleys are in the engaged position, the multiplicity of rollers limiting the outward movement of portions of the belts around the traction pulleys when the idler pulleys are in the disengaged position, the rollers spaced apart and circling more than half way around each traction pulley on sides of the traction pulleys opposite the other traction pulley.

* * * * *